July 2, 1963
A. HILADO
3,095,761
SELF LOCKING DIFFERENTIAL MECHANISM
Filed March 18, 1960
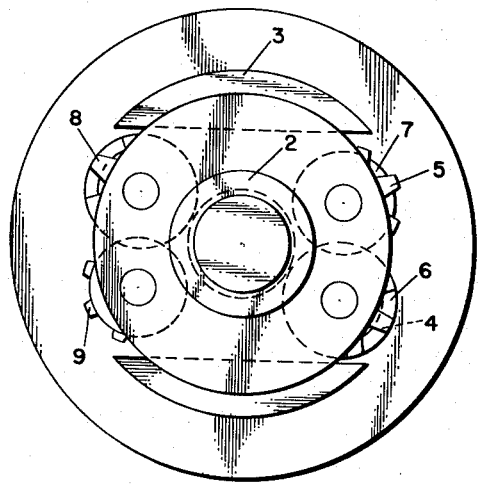
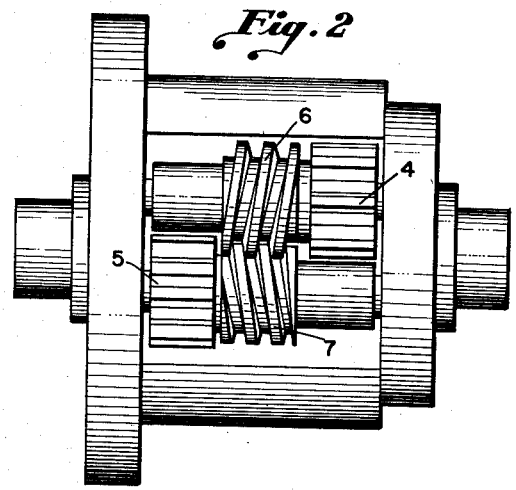
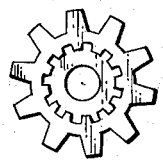
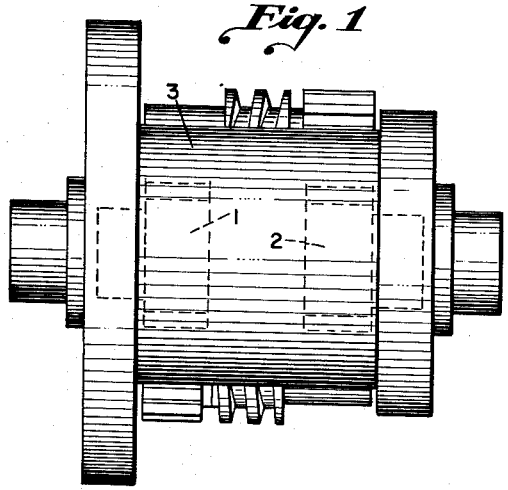
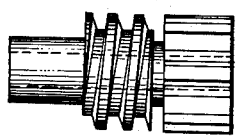
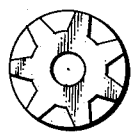
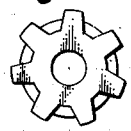
INVENTOR 3,095,761
SELF LOCKING DIFFERENTIAL MECHANISM
Alfonso Hilado, Paranaque, Rizal, Republic of the Philippines (Rufino Bldg., Ayala Ave., Makti, Rizal, Republic of the Philippines)
Filed Mar. 18, 1960, Ser. No. 16,105
Claims priority, application Republic of the Philippines Dec. 21, 1959
5 Claims. (Cl. 74—715)

The present invention relates to what is commonly known as a differential gear assembly usually employed in the power transmission systems of automobile land vehicles between the prime mover and two oppositely disposed vehicle-driving traction wheels and which allows for differential movement of the driving traction wheels on opposite sides of the vehicle, particularly when said vehicle is moving in an arcuate or circular path.

Since the advent of automotive land vehicles, generally known as "automobiles," a planetary spur or beveled gear differential mechanism has been employed which has well known drawbacks, such as when one of the traction driving wheels of the vehicle is on or encounters a slippery portion of the ground or supporting surface, it loses its traction with the said surface and spins freely while the opposite traction wheel loses its power to drive the vehicle forward, even though having good traction with the ground or supporting surface, whether the vehicle is standing still or already proceeding forwardly or backwardly whether along a straight line or in an arcuate path. These ordinary or customary gearing assemblies, while having this inherent defect or shortcoming, have been and are now most generally used because of their simple design, their relatively easily and cheaply producible parts, their durability and relatively long life in use, the celerity and facility with which they can be assembled and disassembled, and the relatively low cost at which they may be repaired or serviced. While attempts have been made previously to overcome the above-mentioned shortcomings, such proposals have had little or no public acceptance, which is believed to be due to the fact that, in attempting to overcome said inherent defect, the structures that have been proposed for this purpose are not only more complicated and expensive in construction but also compromise between applying power efficiently to both driving traction wheels and obtaining good differential of said traction wheels or, else, are of a type of gearing and organization as is impractical or noisy and costly or not otherwise durable in long continued use to which automobiles are usually subjected.

The object of the present invention is to overcome all the above-mentioned drawbacks by the provision of a very simple and new arrangement of noiseless gearing assembly producing a power transmission differential utilizing operating parts that are commonly known and are easily and cheaply produced, the arrangement being such that the driving power is supplied fully to each driving traction wheel, when the vehicle is proceeding in a straight linear course even when one of the wheels is on a slippery or soft surface, by a positive locking action due to jamming of the parts (rather than by depending upon their sluggishness due to friction) and which jamming is released when the vehicle proceeds in an arcuate path, to permit for differential action between the driving traction wheels, at the same time, applying driving power to each of the traction wheels in exact proportion to the radius of the arc in which each traction wheel is traveling.

In the drawings, which form a part of this specification by reference and which illustrate the presently preferred form of the invention, FIGURE 1 is a side view of the complete differential equipped with the present invention and showing a gearing box or carrier in side view.

FIGURE 2 is a plan view of the same as viewed from the top.

FIGURE 3 is an end view of FIGURE 2 as viewed from the right side but turned around 180° so that planetary gears 4 and 5 and worms 6 and 7 of FIGURE 2 are shown on the right side of FIGURE 3 and not on the left side.

FIGURE 4a shows a side and FIGURE 4 an end view of gear elements 1 and 2.

FIGURE 5 shows a side and FIGURE 5a an end view of the big worm with its planetary gear.

FIGURE 6a shows a side and FIGURE 6 an end view of the small worm and its planetary gear.

This self-locking differential mechanism consists essentially of two side spur gear elements 1 and 2 (FIG. 1), inside the differential box or carrier 3. These side gear elements are connected to the rear axle shafts on both sides of the vehicle by means of fluted or splined holes through which the fluted or splined ends of the shafts are inserted.

Meshing with side gear element 2 is a planetary gear 4 (FIG. 2 and FIG. 3) and meshing with side gear element 1 is another planetary gear 5, both planetary gears being carried by the differential box 3 through properly located trunnions or pins and constrained from longitudinal motion along their axes. Planetary gear 4 carries a hardened left-handed worm 6 (FIG. 2 and FIG. 3) which mesh with a hardened right-handed worm 7 carried by planetary gear 5, both worms being integral with the corresponding planetary gears. Left-handed worm 6 is slightly larger in diameter than the right-handed worm 7, but the two worms have the same number of threads per inch of their axial length and, consequently, the lead angles or helix angles of the two worms with a plane normal to their axes are slightly different. This difference in lead angle or helix angle would prevent two square-threaded worms from meshing with each other but the threads of worms 6 and 7 are slightly tapered radially similar to the acme threads which will permit the worms to mesh with each other even if they are of slightly different lead angles or helix angles. This difference in lead angles or helix angles is essential to the operation of the locking feature of this differential; in ordinary helical gears, which include the case of matching left-handed and right-handed worms, the helix angles of the matching teeth or threads are equal and the points of contact at the pitch circles of the matching gears or worms have equal linear velocities and the angular velocities of the matching gears or worms are inversely proportional to their pitch diameters. In the present design, however, since the lead angles or helix angles are slightly different while the number of threads per inch of axial length is the same for both worms, the linear velocity of the points of contact at the pitch circle of the larger worm has to be greater than the linear velocity of the points of contact at the pitch circle of the smaller worm while the angular velocities of the two worms have to be equal in order that the axial travel of the flatter helix of the big worm will be as fast as the axial travel of the steeper helix of the small worm, to keep the two worms in mesh. This is an entirely new idea in matching worms and gears.

The result of this condition is that the pitch circles of the two worms are in sliding contact and not in rolling contact as in ordinary helical gears and if the lead angles or helix angles are made smaller than the angle whose tangent determines the coefficient of sliding friction for the materials and lubricating and other operating conditions obtaining in a given case, as is the essential feature in the present design, the bigger worm would be able to drive the smaller worm but the latter would not be able to drive the bigger worm because the angular driving effort can force the points of contact at the pitch circle of the larger worm to travel faster than the points of contact at the pitch circle of the smaller worm if the larger worm is the driver and the helix angle is smaller than the angle whose tangent determines the coefficient of sliding friction as aforesaid, the points of contact at the pitch circle of the larger worm can not travel faster, as they should, than the points of contact at the pitch circle of the smaller worm which is the driver and therefore, no motion can take place and the mechanism is locked. The small worm 7 (FIG. 2 and FIG. 3) is connected to side gear element 1 (FIG. 1) through planetary gear 5 (FIG. 2 and FIG. 3) and so is the larger worm 6 (FIG. 2 and FIG. 3) connected to side gear element 2 (FIG. 1) through planetary gear 4 (FIG. 2 and FIG. 3) so that, if these were the only planetary gears involved, side gear element 2 would be able to drive side gear element 1 through big worm 6 driving small worm 7 but side gear element 1 would not be able to drive sied gear element 2 because worm 7 can not drive big worm 6; however, on the other side of the view shown in FIGURE 2, another pair of planetary gears and hardened worms 8 and 9 are positioned as shown in FIG. 3, so that larger worm 8 (FIG. 3) is connected to side gear element 1 (FIG. 1) and small worm 9 (FIG. 3) is connected to side gear element 2 (FIG. 1) and the locking effect is reversed, with the result that neither of the two side gear elements 1 and 2 can drive the other but, naturally, if the two side gear elements 1 and 2 are independently turned in the proper direction and speed by outside forces, there is nothing in the mechanism that will lock it, as long as no driving effort is transferred from one side to the other, or prevent it from unlocking if it had previously locked by a tendency to transfer power from one side to the other.

In actual operation in a vehicle, the differential box or carrier 3 is driven by the engine of the vehicle through suitable transmission mechanisms and the two driving wheels of the vehicle are in turn driven by the differential box or carrier 3 through side gear elements 1 and 2. As long as the driving wheels have good traction on the road and the vehicle is traveling along a straight line, no relative motion takes place within the differential box or carrier 3 and the two driving axles on both sides of the vehicle are moving in unison as if they were connected by a solid piece instead of the differential. When the vehicle, however, turns a corner or a curve, the traction of the road constrains the wheel traveling on the inside of the curve to travel slower than the wheel traveling on the outside of the curve and, relatively to the differential box or carrier 3, which is kinematically midway between the two driving wheels and turns at the average speed of the two driving wheels, these wheels are turned in opposite directions at equal speeds by outside forces and these motions are precisely the motions necessary to prevent the locking feature of the mechanism to take effect as, in this case, no driving effort is transferred from one side to the other. Should, however, one driving wheel lose its traction on the ground because of mud, snow or any other kind of slippery contact, then the result of the driving effort of the engine through the differential box or carrier 3 and the traction of the ground on the wheel which is not slipping, is the same as if one side of the differential is being turned to drive the other side and this effort locks the differential with the result that the driving effort of the engine is transmitted to the wheel with good traction and the vehicle continues to travel in spite of the slipping of the other wheel, and thus automatically preventing the vehicle from stalling which would be the case if the differential were of the ordinary non-locking type.

The primary advantage of this improved differential mechanism lies in its ability to maintain a full positive delivery of power to both driving traction wheels of vehicles, and the like, even if there is a partial or complete loss of traction at one of the driving traction wheels. When there is a perfect traction between the traction wheels and the road, the effect is the same as if the traction wheels were geared to the road; and whenever a slip occurs between a traction wheel and the road, the traction drive continues to operate on the other traction wheel and this, in practice, happens with recurring frequency every time that the wheels make little jumps from the road and, in effect, both traction wheels may drive together or alternately, whether in a straight path or when making turns in arcuate paths.

Having described the invention and manner in which the same is to be performed, it is obvious to those skilled in the art that certain changes and modifications may be made therein; and, therefore, it is to be understood that the invention is not to be limited to the exact construction herein shown and described but shall include all modifications and changes that fall within the spirit of the invention and the scope of the appended claims.

That which is claimed as new is:

1. In a differential mechanism, a rotatable gearing box or carrier, drivable members extending into opposite ends of said carrier, a gear element splined to each member respectively and lying within said carrier, each gear element having spur teeth thereon, mating planetary gear for each gear element journaled in said carrier, in pairs, each planetary gear mating with the corresponding gear element being provided with a hardened worm integrally co-axial with said mating plenetary gear, and said planetary gear with integral co-axial worm set in pairs with their worms in mesh with each other, one worm of each pair being left handed and the other right handed, and one worm slightly larger in diameter than is called for by the ratio of revolutions between the two worms and both planetary gears and worms being constrained from moving longitudinally along their axes.

2. A differential mechanism as set forth in claim 1, wherein the said worms are provided with threads tapering radially so that the two worms of each pair will mesh with each other in spite of their having different helix angles due to the difference in the ratio of their diameters from what is called for by the ratio of their revolutions.

3. A differential mechanism as set forth in claim 1, wherein the said mating worms of each pair are not co-tangent, that is, the mating worms of each pair do not have common tangents at their points of contact but, instead the tangents to the meshing rooms at their points of contact intersect at said points of contact.

4. A differential mechanism as set forth in claim 1, wherein one big hardened worm and one small hardened worm are paired and meshed on one side of the carrier, the big worm being connected to one gear element through its integral planetary gear and the small worm also connected to the opposite gear element through its corresponding integral planetary gear while, on the opposite side of the carrier, another pair of one big and one small hardened worms are meshed together and connected to the gear elements in the reverse order, that is, the big worm is connected to the gear element to which the small worm on the other side of the carrier is connected and the small worm is connected to the gear element to which the big worm on the other side of the carrier is connected.

5. A differential mechanism as set forth in claim 1, wherein the helix angles of the worms are less than the angle whose tangent determines the coefficient of sliding friction for the materials and the lubricating and other operating conditions obtaining in each particular case.

References Cited in the file of this patent

UNITED STATES PATENTS

| | | |
|---|---|---|
| 1,164,769 | Walter | Dec. 21, 1915 |
| 1,397,066 | Williams | Nov. 15, 1921 |
| 2,900,846 | Lehman | Aug. 25, 1959 |
| 2,973,660 | Popper | Mar. 7, 1961 |